(12) United States Patent
Consaul

(10) Patent No.: US 12,545,064 B1
(45) Date of Patent: Feb. 10, 2026

(54) METHOD AND APPARATUS FOR ATTACHING AUTOMOTIVE LIGHTING AND OTHER ACCESSORIES

(71) Applicant: BMC LIGHTS LLC, Tampa, FL (US)

(72) Inventor: Brian David Consaul, Tampa, FL (US)

(73) Assignee: BMC LIGHTS LLC, Tampa, FL (US)

( * ) Notice: Subject to any disclaimer, the term of this patent is extended or adjusted under 35 U.S.C. 154(b) by 317 days.

(21) Appl. No.: 18/125,241

(22) Filed: Mar. 23, 2023

(51) Int. Cl.
| | |
|---|---|
| *B60D 1/58* | (2006.01) |
| *B60Q 1/00* | (2006.01) |
| *B60Q 1/26* | (2006.01) |
| *B60R 3/00* | (2006.01) |
| *B62D 25/16* | (2006.01) |

(52) U.S. Cl.
CPC .............. *B60D 1/58* (2013.01); *B60Q 1/0035* (2013.01); *B60Q 1/2657* (2013.01); *B60R 3/00* (2013.01); *B62D 25/163* (2013.01)

(58) Field of Classification Search
CPC ...... B60D 1/58; B60Q 1/0035; B60Q 1/2657; B60R 3/00; B62D 25/163
See application file for complete search history.

(56) References Cited

U.S. PATENT DOCUMENTS

| | | | | |
|---|---|---|---|---|
| 3,608,931 | A | | 9/1971 | Moline |
| 3,838,872 | A | * | 10/1974 | Fullhart ................. B60R 19/26 280/495 |
| 4,202,562 | A | | 5/1980 | Sorenson |
| D328,447 | S | * | 8/1992 | Ahleen ..................... D12/185 |
| 5,149,122 | A | | 9/1992 | Helber |
| 5,489,111 | A | * | 2/1996 | Collins ................. B60D 1/485 280/495 |
| 5,507,515 | A | * | 4/1996 | Schellenberg ........... B60D 1/38 280/491.5 |
| 5,511,813 | A | * | 4/1996 | Kravitz .................... B60D 1/42 280/495 |
| 5,620,198 | A | * | 4/1997 | Borchers ................ B60D 1/52 280/491.5 |
| 5,620,218 | A | * | 4/1997 | Saltzman ................ B60D 1/48 280/505 |
| 5,833,254 | A | * | 11/1998 | Bucho .................. B62D 25/188 280/154 |
| 5,871,270 | A | * | 2/1999 | Ricker .................. B60Q 1/305 362/396 |
| 6,007,033 | A | * | 12/1999 | Casson .................. B60Q 1/503 403/3 |
| 6,076,842 | A | * | 6/2000 | Knoer .................. B62D 25/188 224/42.31 |
| 6,105,989 | A | * | 8/2000 | Linger .................. B60D 1/241 280/506 |
| 6,179,311 | B1 | * | 1/2001 | Larkin ................. B62D 25/188 280/154 |

(Continued)

FOREIGN PATENT DOCUMENTS

CA    2279699 A1 *  2/2000

*Primary Examiner* — Jacob B Meyer
(74) *Attorney, Agent, or Firm* — GRONHOLM PATENT SERVICES

(57) ABSTRACT

The present invention provides an improvement for the attachment of lighting or other accessories to a vehicle. In one configuration, a light box is attached to the rear of a vehicle by the use of a novel attachment feature, namely attachment via the use of protruding chain loops. Other accessories may similarly be attached thereto through similar means.

14 Claims, 12 Drawing Sheets

(56) References Cited

U.S. PATENT DOCUMENTS

| | | | | |
|---|---|---|---|---|
| 6,375,223 B1 * | 4/2002 | Kirckof | B62D 25/188 | 280/154 |
| 6,379,028 B1 * | 4/2002 | Crouse | B60Q 1/22 | 362/549 |
| 6,485,059 B2 * | 11/2002 | Burnstein | B62D 25/188 | 280/851 |
| 6,491,315 B2 * | 12/2002 | Hagen | B60Q 1/2661 | 280/169 |
| 6,874,806 B1 * | 4/2005 | Blake | B60D 1/60 | 280/507 |
| 6,883,945 B1 * | 4/2005 | Gonzalez | B60Q 1/30 | 362/545 |
| D509,919 S * | 9/2005 | Durgan | D26/28 | |
| 6,942,252 B2 * | 9/2005 | Buuck | B62D 25/188 | 280/847 |
| 7,008,088 B2 * | 3/2006 | Pisciotti | B60Q 1/305 | 362/549 |
| 7,347,597 B2 * | 3/2008 | French | B60D 1/62 | 362/540 |
| 7,931,302 B2 * | 4/2011 | Vaughn | B62D 25/186 | 280/847 |
| 8,091,914 B1 * | 1/2012 | Long | B60D 1/06 | 280/477 |
| 8,562,013 B1 * | 10/2013 | Wentz, Jr. | B60D 1/07 | 280/495 |
| 8,668,227 B1 * | 3/2014 | Peotter | B62D 25/209 | 280/847 |
| 9,079,465 B1 | 7/2015 | Sanftleben | | |
| 9,387,888 B2 * | 7/2016 | Schmeichel | B62D 25/188 | |
| D763,484 S * | 8/2016 | Salami, Jr. | D12/106 | |
| 9,422,009 B2 * | 8/2016 | Schmeichel | B62D 25/163 | |
| D777,954 S * | 1/2017 | Salami, Jr. | D26/28 | |
| 9,616,820 B2 * | 4/2017 | Raley | B60R 9/065 | |
| 9,724,974 B2 * | 8/2017 | Schmeichel | B62D 25/182 | |
| 9,738,126 B2 * | 8/2017 | Mantovani | B60D 1/485 | |
| 9,805,632 B2 * | 10/2017 | Frost | G09F 13/08 | |
| 9,821,616 B1 * | 11/2017 | Sayers | B60D 1/187 | |
| 9,849,825 B2 * | 12/2017 | Salami, Jr. | B60Q 1/24 | |
| 10,065,466 B2 * | 9/2018 | Lisby | B60D 1/488 | |
| 10,300,960 B1 * | 5/2019 | Wingen | B60D 1/58 | |
| 10,821,790 B2 * | 11/2020 | Shaeff | B60D 1/52 | |
| 11,351,929 B2 | 6/2022 | Mcfadden | | |
| 12,077,098 B1 * | 9/2024 | Spiecha | B60Q 1/30 | |
| 12,246,775 B2 * | 3/2025 | Pimlott | B62D 25/188 | |
| 2019/0100130 A1 * | 4/2019 | Banks | B60Q 1/305 | |
| 2022/0194480 A1 * | 6/2022 | Stolworthy | B60D 1/58 | |
| 2023/0092434 A1 * | 3/2023 | Stolworthy | B60R 3/00 | 280/851 |

\* cited by examiner

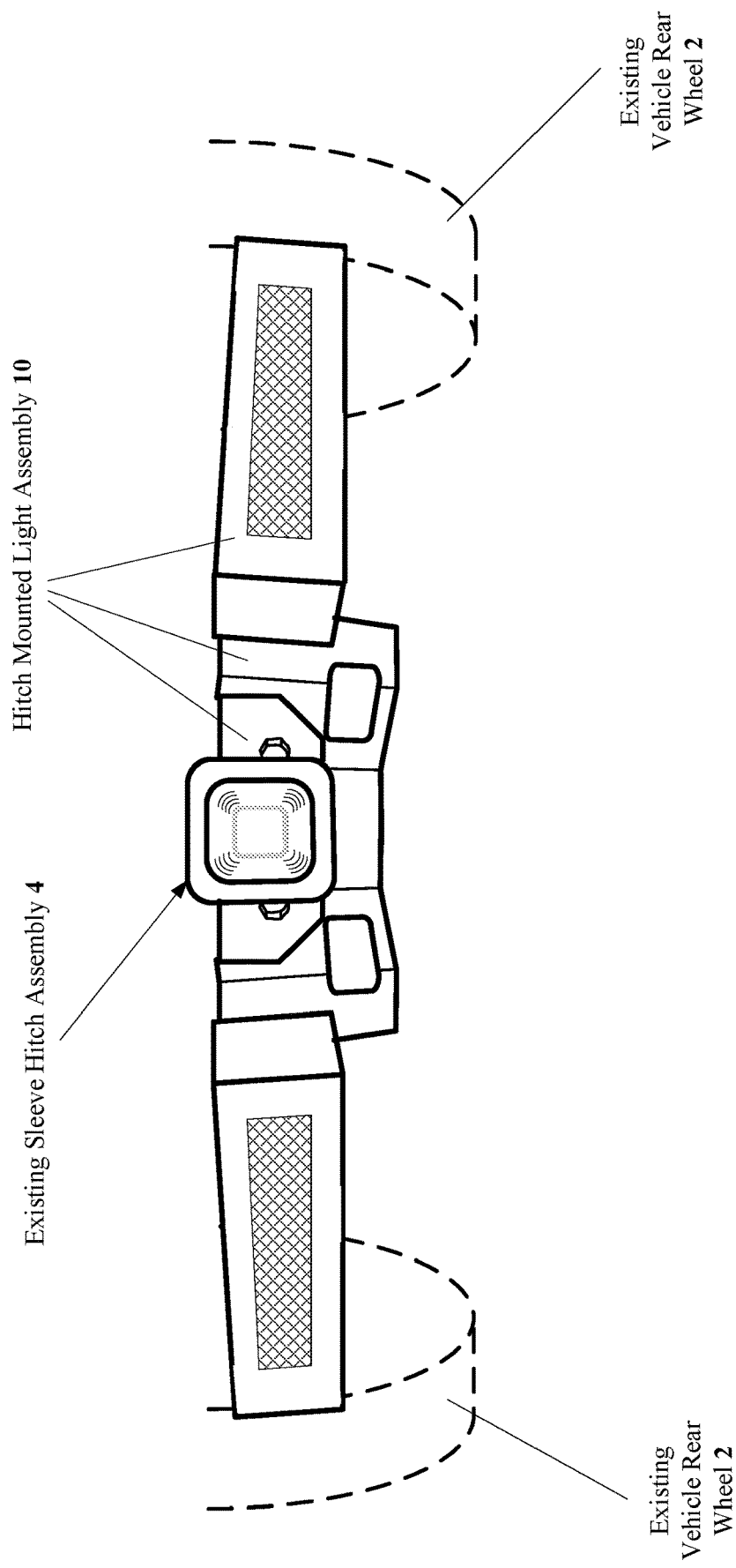

Existing Chain
Loops 01
(horizontal
plate)

Existing Chain Loops 101
(made of round bar stock)

METHOD AND APPARATUS FOR ATTACHING AUTOMOTIVE LIGHTING AND OTHER ACCESSORIES

FIELD

Exterior lighting for vehicles is well known in the art, including light on all sides of the vehicles, used for various purposes.

This disclosure relates to a method and apparatus for attaching automotive lighting or other accessories, including but not limited to aftermarket accessory lighting.

BACKGROUND

Prior art configurations of factory installed or aftermarket accessory lighting include poorly fitting attachments, and/or unsightly installations.

Therefore, improvements in factory installed or aftermarket accessory lighting are always welcomed.

SUMMARY

One basic aspect of the present invention generally relates to the use of chain loops as a connection point in order to attach lights or other accessories to the rear of a vehicle.

Therefore, it is an object of the present invention to provide a device for attachment to a vehicle, said vehicle having a first chain loop and a receiver hitch sleeve member defining a receiver sleeve hitch member opening, said first chain loop configured for attachment relative to a trailer safety chain, said first chain loop being rigid and rigidly attached relative to the frame of said vehicle, said receiver hitch sleeve opening configured for accepting a trailer hitch mount, said device comprising: A) a base member assembly configured to be attached relative to said first chain loop, said base member assembly comprising: 1) a clamping portion; and 2) a second chain loop, B) a clamping member; C) a light member attached to said base member assembly; and D) an elongate fastener configured to connect to said clamping portion of said base member assembly and also configured to connect to said clamping member, such that said clamping portion of said base member assembly and said clamping member combine to fixedly capture said first chain loop therebetween, thus providing a selective fixed installed connection between said first chain loop and said base member assembly, said fixed installed connection provided by said elongate fastener, said base member assembly when installed configured to provide clearance such that said receiver hitch remains available for use after said base member assembly is connected, in that said receiver sleeve hitch member opening is free to accept a trailer hitch mount without interference from said base member assembly, and said base member assembly when installed providing a second chain loop for use in place of said first chain loop.

It is a further object of the present invention to provide a device as noted above It is a further object of the present invention to provide a device as noted above It is a further object of the present invention to provide a device as noted above wherein said clamping portion of said base member assembly is a part of a clamping panel being a portion of said base member assembly.

It is a further object of the present invention to provide a device as noted above wherein said first chain loop defines a first chain loop cavity, and further comprising a locating spacer defining a hole therein for accepting a length of said elongate fastener, said locating spacer when installed providing a spacing feature within said first chain loop cavity.

It is a further object of the present invention to provide a device as noted above further comprising a mud flap attached to and supported by said base member assembly.

It is a further object of the present invention to provide a device as noted above further comprising a footstep attached to and supported by said base member assembly.

It is a further object of the present invention to provide a device as noted above wherein said first chain loop is a first chain loop pair, wherein said clamping portion is a clamping portion pair, wherein said clamping member is a clamping member pair, wherein said elongate fastener is an elongate fastener pair, and wherein one element in each said pair cooperates to provide a connection between said base member assembly and said vehicle, and the other element in each said pair cooperates to provide another connection between said base member assembly and said vehicle.

It is a further object of the present invention to provide a device for attachment to a vehicle, said vehicle having a first chain loop and a receiver hitch sleeve member defining a receiver sleeve hitch member opening, said first chain loop configured for attachment relative to a trailer safety chain, said first chain loop being rigid and rigidly attached relative to the frame of said vehicle, said receiver hitch sleeve opening configured for accepting a trailer hitch mount, said device comprising: A) a base member assembly configured to be attached relative to said first chain loop, said base member assembly comprising: 1) a clamping portion; 2) an accessory mounting portion; and 3) a second chain loop, B) a clamping member; and C) an elongate fastener configured to connect to said clamping portion of said base member assembly and also configured to connect to said clamping member, such that said clamping portion of said base member assembly and said clamping member combine to fixedly capture said first chain loop therebetween, thus providing a selective fixed installed connection between said first chain loop and said base member assembly, said fixed installed connection provided by said elongate fastener, said base member assembly when installed configured to provide clearance such that said receiver hitch remains available for use after said base member assembly is connected, in that said receiver sleeve hitch member opening is free to accept a trailer hitch mount without interference from said base member assembly, and said base member assembly when installed providing a second chain loop for use in place of said first chain loop.

It is a further object of the present invention to provide a device as noted above wherein said clamping portion of said base member assembly is a part of a clamping panel being a portion of said base member assembly.

It is a further object of the present invention to provide a device as noted above, wherein said first chain loop defines a first chain loop cavity, and further comprising a locating spacer defining a hole therein for accepting a length of said elongate fastener, said locating spacer when installed providing a spacing feature within said first chain loop cavity.

It is a further object of the present invention to provide a device as noted above, wherein said accessory mounting portion is configured to attach to and support a mud flap.

It is a further object of the present invention to provide a device as noted above, wherein said accessory mounting portion is configured to attach to and support a foot step.

It is a further object of the present invention to provide a device as noted above wherein said first chain loop is a first chain loop pair, wherein said clamping portion is a clamping portion pair, wherein said clamping member is a clamping member pair, wherein said elongate fastener is an elongate fastener pair, and wherein one element in each said pair cooperates to provide a connection between said base member assembly and said vehicle, and the other element in each said pair cooperates to provide another connection between said base member assembly and said vehicle.

It is a further object of the present invention to provide a method of attaching lighting or other accessories to a vehicle, said vehicle having a first chain loop and a receiver hitch sleeve member defining a receiver sleeve hitch member opening, said first chain loop configured for attachment relative to a trailer safety chain, said first chain loop being rigid and rigidly attached relative to the frame of said vehicle, said receiver hitch sleeve opening configured for accepting a trailer hitch mount, said method comprising: A) providing a base member assembly configured to be attached relative to said first chain loop, said base member assembly comprising: 1) a clamping portion; and 2) a second chain loop, B) providing a clamping member; C) providing a light member attached to said base member assembly; and D) providing an elongate fastener connecting said clamping portion of said base member assembly to said clamping member, such that said clamping portion of said base member assembly and said clamping member combine to fixedly capture said first chain loop therebetween, thus providing a selective fixed installed connection between said first chain loop and said base member assembly, said fixed installed connection provided by said elongate fastener, such that said base member assembly when installed provides clearance such that said receiver hitch remains available for use after said base member assembly is connected, in that said receiver sleeve hitch member opening is free to accept a trailer hitch mount without interference from said base member assembly, and such that said base member assembly when installed provides a second chain loop for use in place of said first chain loop.

It is a further object of the present invention to provide a device as noted above, wherein said first chain loop defines a first chain loop cavity, and further comprising the step of providing a locating spacer defining a hole therein accepting a length of said elongate fastener, said locating spacer when installed providing a spacing feature within said first chain loop cavity.

It is a further object of the present invention to provide a device as noted above, further comprising the step of attaching a mud flap to said base member assembly.

It is a further object of the present invention to provide a device as noted above, further comprising the step of attaching a footstep to said base member assembly.

It is a further object of the present invention to provide a device as noted above, wherein said first chain loop is a first chain loop pair, wherein said clamping portion is a clamping portion pair, wherein said clamping member is a clamping member pair, and wherein said elongate fastener is an elongate fastener pair, wherein during installation, one element in each said pair cooperates to provide a connection between said base member assembly and said vehicle, and the other element in each said pair cooperates to provide another connection between said base member assembly and said vehicle.

These and other objects and aspects will become readily apparent upon further review of the following specification and drawings. Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 1 is a rear view of a hitch mounted light assembly 10 attached to an existing sleeve hatch assembly 4. Also shown our two existing rear wheels 2.

DETAILED DESCRIPTION

Introduction

Figure 2A:
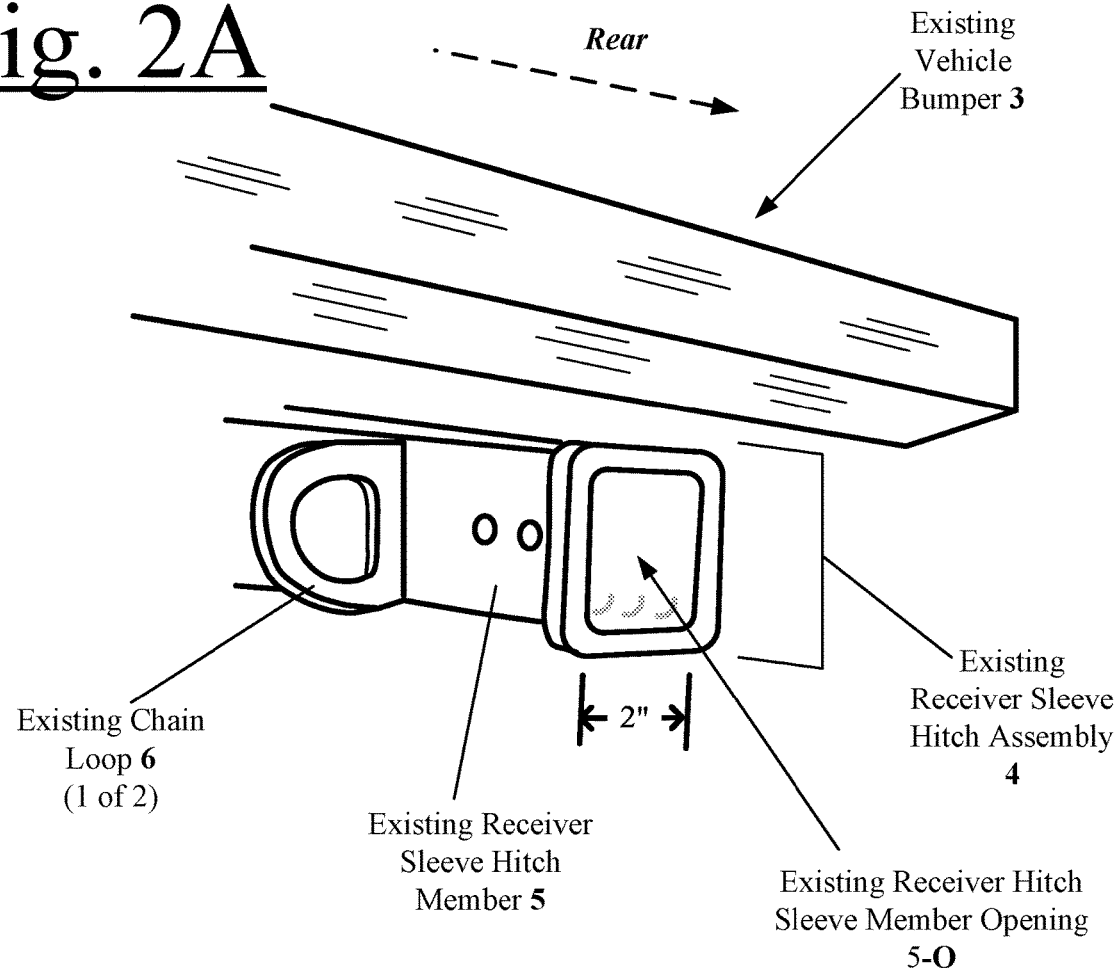
FIG. 2A is a rear view of an existing sleeve hitch assembly 4, including an existing receiver sleeve hitch member 5 and an existing chain loop 6. The other chain loop is not shown but it should be understood there is a pair. Also shown is an existing bumper 3. In this configuration, the chain loops 6 do not extend outwardly perpendicular to the longitudinal axis of the sleeve hitch, but they are fixed at an angle which can be seen better in FIG. 5. That being said, they can be understood as substantially "vertical" chain loops as their primary planar surfaces are in coparallel vertical axes.

The present invention now will be described more fully hereinafter with reference to the accompanying drawings, in which some, but not all embodiments of the inventions are shown. This invention may be embodied in many different forms and should not be construed as limited to the embodiments set forth herein; rather, these embodiments are provided so that this disclosure will satisfy applicable legal requirements. Like numbers refer to like elements throughout.

Reference is now made to the figures, in which like elements indicate like elements throughout the several views.

ELEMENT LIST

Here is a list of some of the various elements:
01. Existing Chain Loops (horizontal plate)
2. Existing Vehicle Rear Wheel
3. Existing Vehicle Bumper
4. Existing Receiver Sleeve Hitch Assembly
　　5. Existing Receiver Sleeve Hitch Member
　　5-O. Existing Receiver Sleeve Hitch Member Opening
　　6. Existing Chain Loops (2)
7. Alternate Existing Receiver Sleeve Hitch Assembly
　　8. Alternate Existing Receiver Sleeve Member
　　9. Alternate Existing Chain Loops (2)
10. Hitch Mounted Light Assembly
20. Base Member Assembly
　　22. Base Frame
　　23. Center panel
　　24. Clamping panels (2)
　　25. New Chain Loop (2)
　　25C. New Loop Cavity (2)
　　26. Fastener holes (2)
　　27. Light box mounting flange (2)
　　28. Light Boxes (2)
　　29. Light elements (2)
30. [reserved]
40. Locating Spacers (2)
50. Retainer Clamp (2)
60. Fastener (2)
　　70. Fastener bolt (2)
　　80. Fastener nut (2)
90. Mud Flap
100. Footstep
122 base frame (for accessories)
　　123 center panel
　　124 clamping panel
　　125 new chain loop (itself defining a chain loop cavity 125C),
　　126 fastener hole
　　127 accessory mounting flange
205. Existing Receiver Sleeve Hitch Member
206. Existing Horizontal Chain Loops (2)
222 base frame (for attachment to vertical loops)
　　224 clamping flange
　　240 locating spacer (fits within chain loop)
　　250 retainer clamp
　　260 fastener

DETAILED DISCUSSION

Basic Construction and Operation

Referring now generally to FIGS. 1, 3, 4-8, the hitch mounted assembly 10 includes the following elements:
a base member assembly 20
two locating spacers 40
two retainer clamps 50
two fastener bolts 70
two fastener nuts 80

Figure 2B:
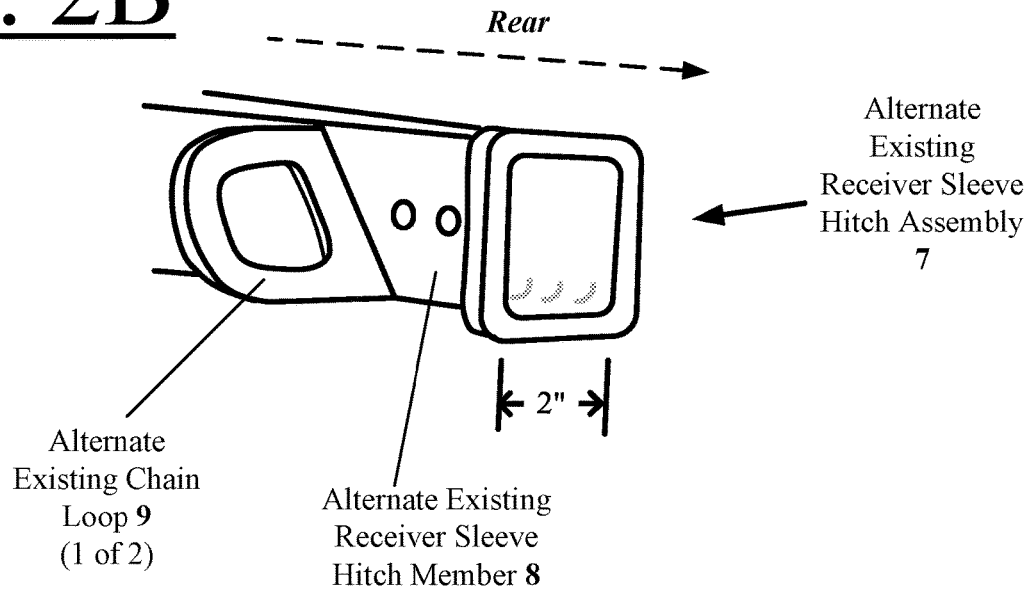
FIG. 2B is a view similar to that of FIG. 2A, except that an alternate existing receiver sleeve hitch assembly 7 is shown. The alternate receiver sleeve hitch assembly 7 includes an alternate existing receiver sleeve member 8, and an alternate existing chain loop 9. The other chain loop is not shown. In this configuration, the chain loops not only are at an angle as the FIG. 2A loops, but the loops 9 also are angled in another axis, with the bottom of the loops 9 being further to the rear than the top edges of the loops 9.
Figure 10:
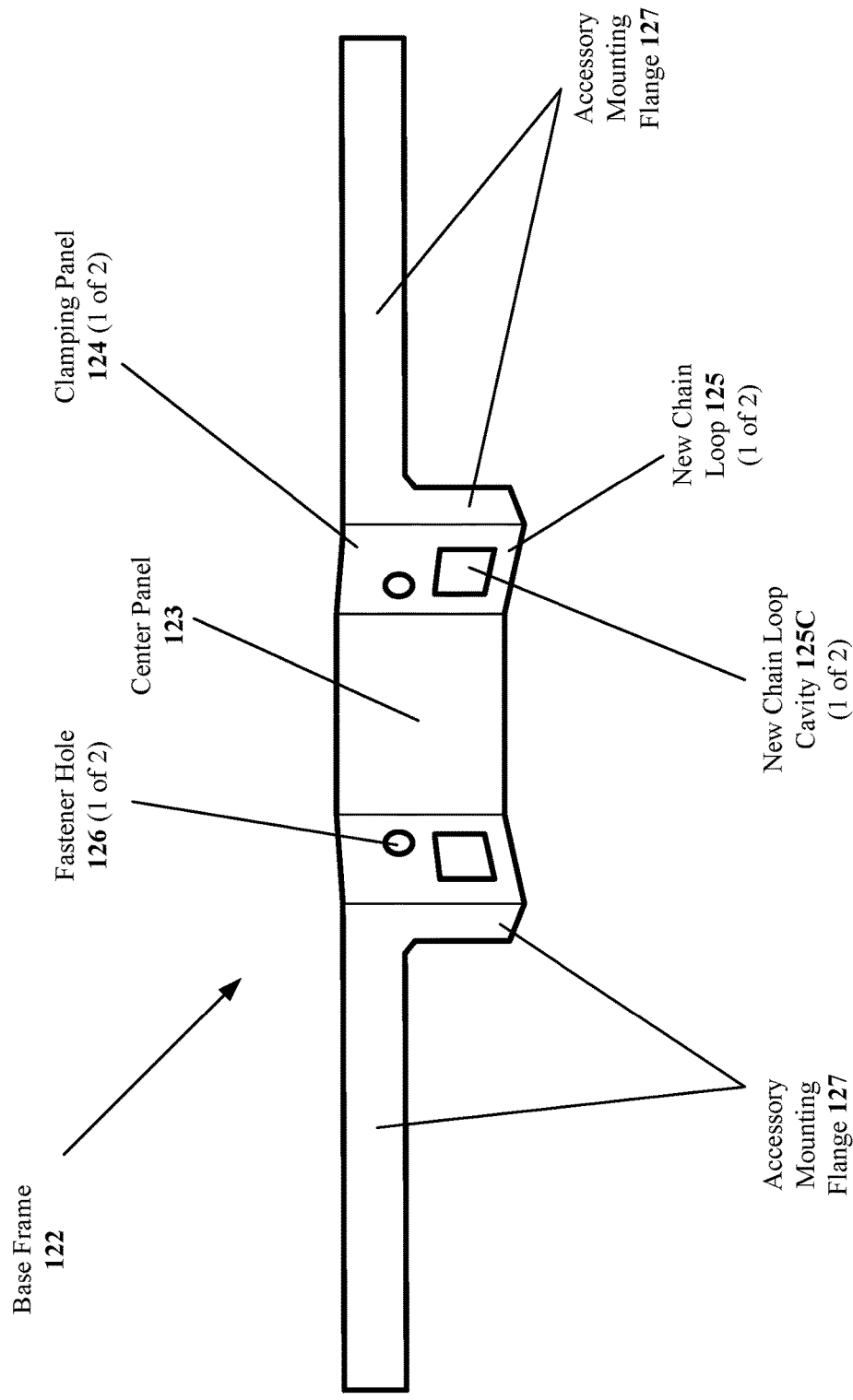
FIG. 10 shows item 122.

The hitch mounted assembly 10 is attached to the frame of a conventional truck or other vehicle by clamping onto the two "chain loops" which are typically on each side of a conventional sleeve hitch such as shown in FIG. 2A, 2B or 10.

Once so attached, the lights in the hitch mounted assembly 10 may be operated as needed.

Construction of Existing Chain Loop Configurations

At this point, reference is made to FIGS. 2A and 2B, in order to describe certain prior art existing chain loop configurations. As is known in the art, safety chain "loops" are provided proximate many known sleeve hitches in order to allow for the attachment of safety chains during a towing operation. Typically, a trailer has a hitch portion which fits over a ball attached to the sleeve hitch. During typical operation, this ball/hitch configuration provides the pivotable connection between the vehicle and a trailer, in order to pull the trailer behind the vehicle. However, as a safety feature, two opposing safety chain "loops" are provided proximate the sleeve hitches in order to allow for the attachment of safety chains. Should the ball/hitch become detached, safety chains are there as a backup to keep the trailer from "running away" and causing damage and/or injury.

Such chain loops are typically rigidly fixed relative to the sleeve member, and thus the remainder of the towing vehicle. The present invention uses the locations and rigidity of said loops in order to provide a mounting point for lights and/or other accessories.

Reference is now made to FIGS. 2A and 2B for particular chain loop configurations. FIG. 2A is a rear view of an existing receiver sleeve hitch assembly 4, including an existing receiver sleeve member 5 and an existing chain loop 6. The other chain loop is not shown. Also shown is an existing bumper 3. In this configuration, the chain loops 6 do not extend outwardly perpendicular to the longitudinal axis of the sleeve hitch, but they are fixed at an angle which can be seen better in FIG. 5.

FIG. 2B is a view similar to that of FIG. 2A, except that an alternate existing sleeve hitch assembly 7 is shown. The alternate sleeve hitch assembly 7 includes an alternate existing sleeve member 8, and an alternate existing chain loop 9. The other chain loop is not shown. In this configuration, the chain loops not only are at an angle as the FIG. 2A loops, but the loops 9 also are angled in another axis, with the bottom of the loops 9 being further to the rear than the top edges of the loops 9.

Thus it may be understood that in typical factory configurations, rigid safety chain "loops" are provided proximate many known sleeve hitches in order to allow for the attachment of safety chains during a towing operation. It may also be understood that such loops may take various formats, with the common feature being that a pass through cavity (aka opening) is provided which allows for the attachment of a clasp, hook, or the like at the end of a safety chain, such that the loop, having the pass through opening, can provide for an attachment between a safety chain and the associated vehicle. Such loops could take the form of flanges made from plate metal, with the flanges having through holes or cavities therein, such as is shown in Figures FIGS. 2A and 2B.

Figure 11:
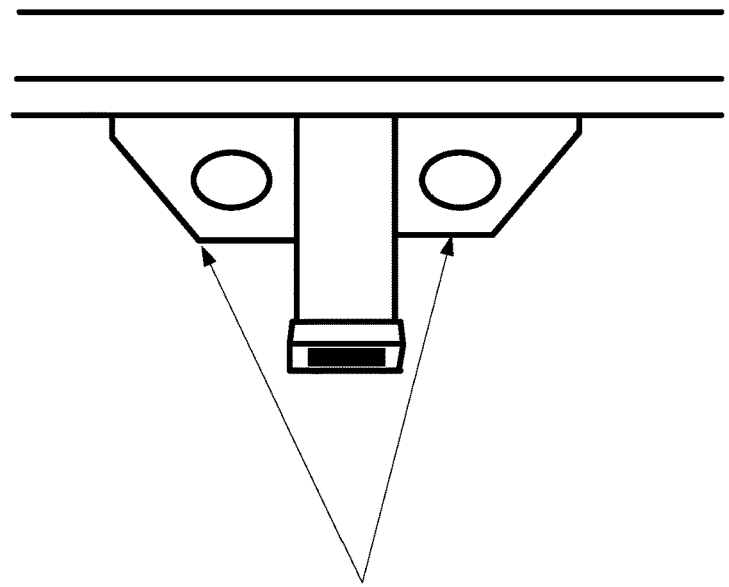
FIG. 11 shows another existing chain loop configuration including two existing chain loops 01, which are formed of steel plate, which the primary planar surfaces of the plate being substantially in the horizontal plane in normal level operation of the vehicle. It may also be understood that round bar stock could also be used in such a configuration to provide similarly oriented holes passing through the chain loops. These chain loops can also be referred to as being "horizonal", as compared to vertical chain loops in FIG. 2A.

Alternately, round bar stock could also be used in such a configuration to provide similarly oriented holes passing through the chain loops. Such round bar stock could be formed into a complete loop and welded to the frame or sleeve hitch attachment as necessary, or could be in the form of U-shaped elements having their free ends welded to the frame or sleeve hitch attachment as necessary, as shown in FIG. 11, which is an isolated view of a sleeve-mountable hitch assembly with U-shaped chain loops 101 welded thereto. It may also be understood that such U-shaped chain loops 101 could be welded to the frame of a vehicle in a variety of orientations.

More Detailed Construction and Operation

Hitch Mounted Assembly 10

As noted above, the hitch mounted assembly 10 includes the following elements:
  a base member assembly 20
  two locating spacers 40
  two retainer clamps 50
  two fasteners, which themselves include:
    two fastener bolts 70
    two fastener nuts 80

Base Member Assembly 20

Figure 3:
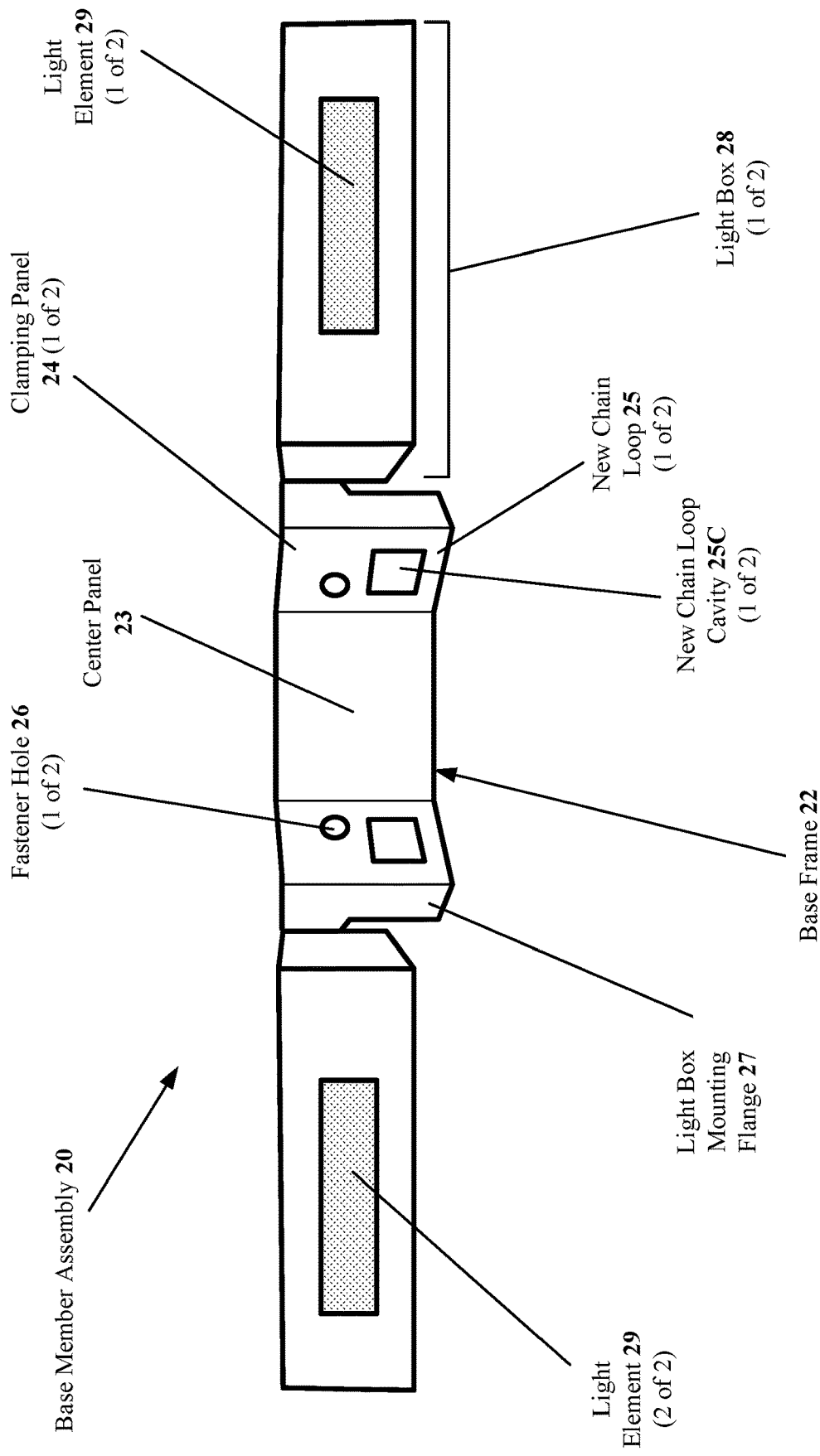
FIG. 3 is an isolated rear view of a light assembly base member assembly 20, which includes a base frame 22, center panel 23, new chain loop 25 itself defining a chain loop cavity 25C, fastener hole 26, light box mounting flange 27, light box 28, and light element 29.
Figure 7:
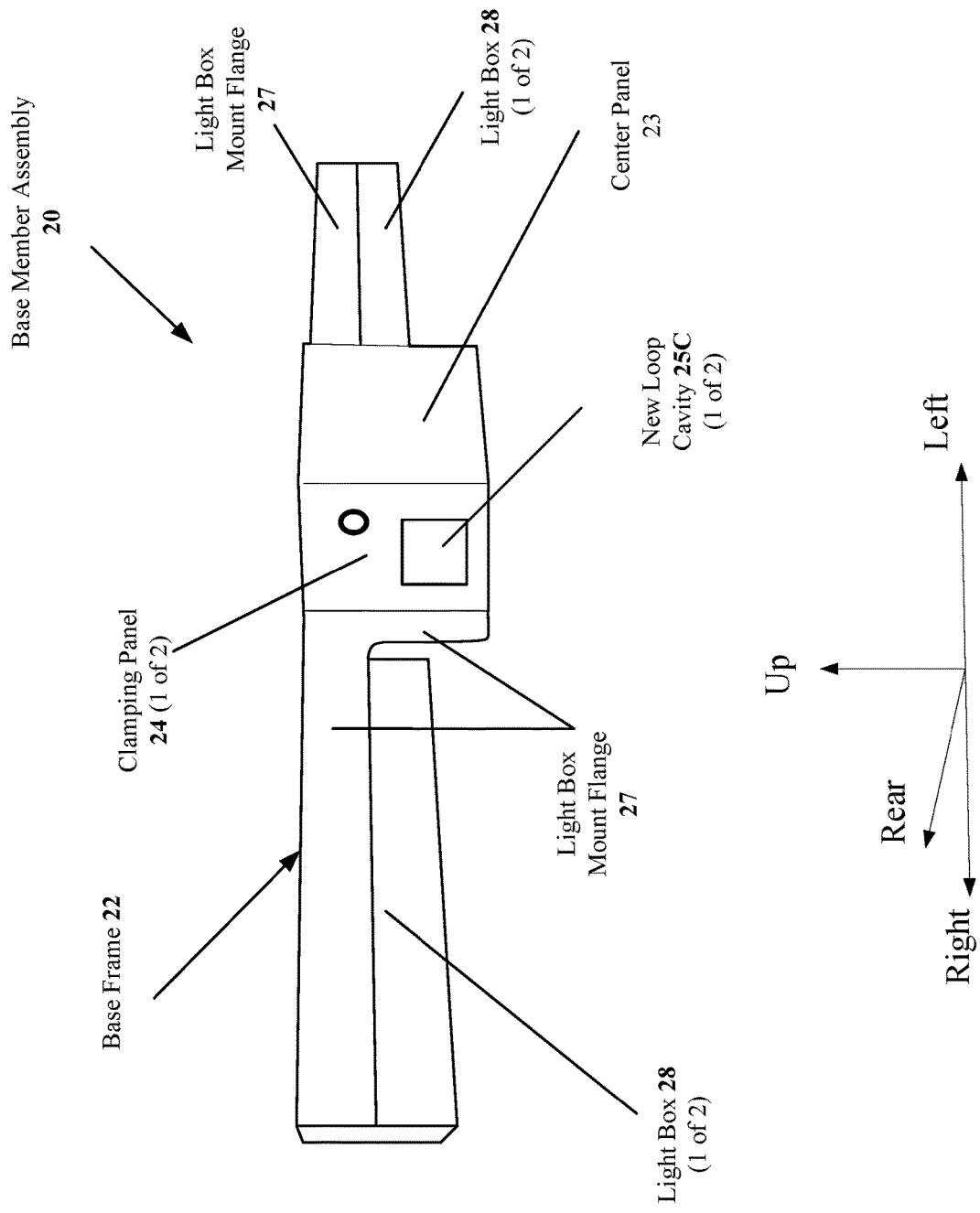
FIG. 7 is a perspective view of the base member assembly 20 in isolation. This view is as if one was standing to the right side of the associated vehicle, and looking at the base member assembly 20. As may be seen, the base member assembly 20 includes a center panel 23, two clamping panels 24 (only one shown here), two light box mounting flanges 27, and two light boxes 28.

The base member assembly 20 is shown in isolation in FIGS. 3 and 7. It includes the following subcomponents/features:
  Base Frame 22
  Center panel 23
  Two Clamping panels 24
  Two New Chain Loops 25 (each defining a new chain loop cavity 25C)
  Two Fastener holes 26
  Two Light box mounting flanges 27
  Two Light Boxes 28
  Two Light elements 29

The base frame 22 is the central frame member, and has the two light boxes 28 attached on each end. The base frame 22 includes the center panel 23, and two clamping panels 24 extending from either side of the center panel 23. Extending from the outsides of the two clamping panels 24 are corresponding light box mounting flanges 27.

Figure 4:
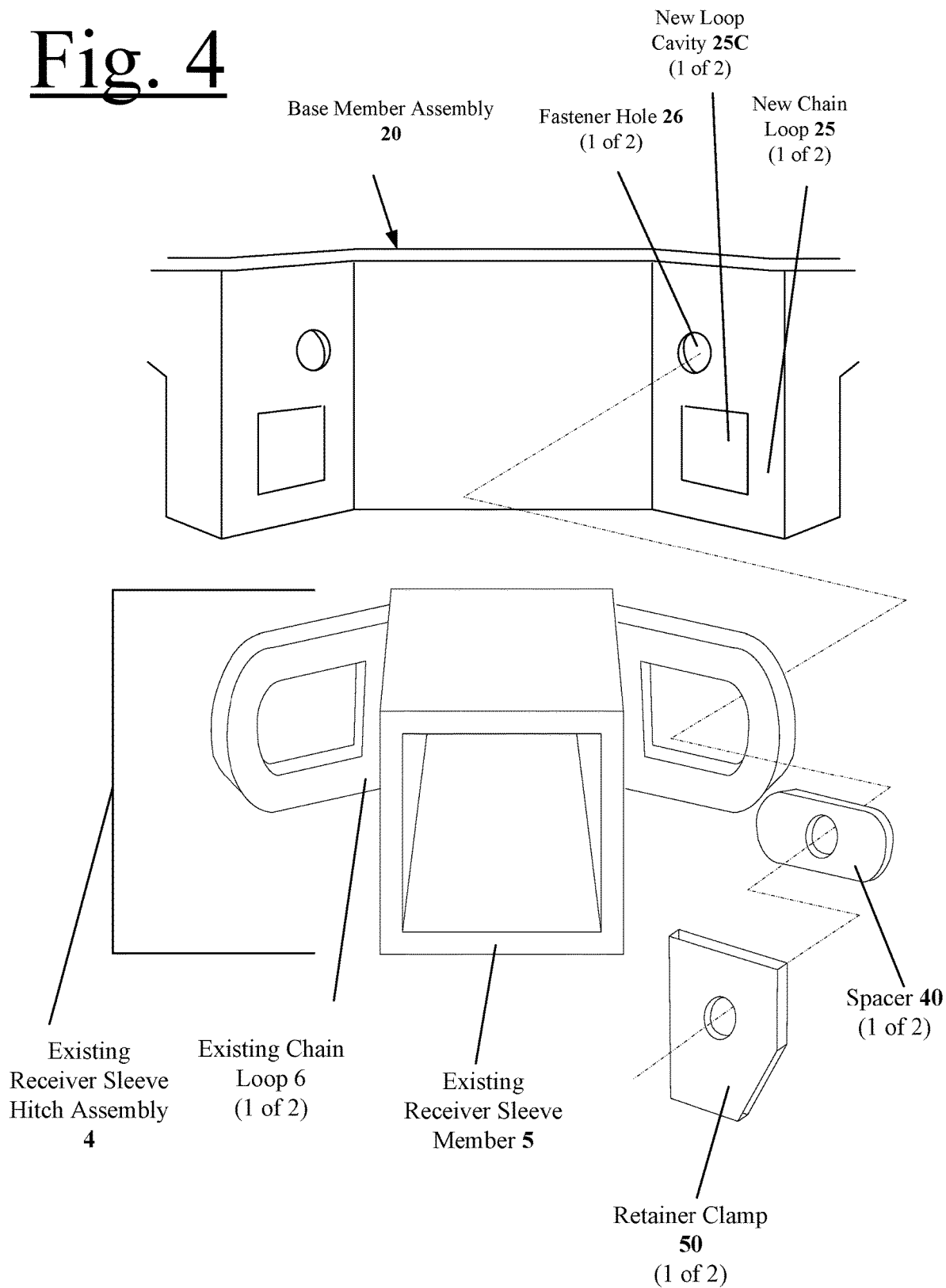
FIG. 4 is an illustrative view showing the attachment of base member assembly 20 to existing sleeve hitch assembly 5. The dotted line shows the connection of various elements by use of an elongate fastener such as a nut and bolt combination (not shown). Such an elongate fastener passes through one of the fastener holes 26 of the base member assembly 20, then passes through the opening in one of the existing chain loops 6 of the existing receiver sleeve member 5. The fastener then continues through the spacer 40, and finally through the retainer clamp 50. When assembled, the locating spacer 40 is positioned within the cavity defined by the existing chain loop 6. The retainer clamp 50 and base member assembly 20 combine to sandwich the existing chain loop 6 therebetween, thereby providing a rigid connection between the base member assembly 20 and the existing sleeve hitch assembly 5 (and thus the supporting vehicle). This is done for both loops 6. When the assembly is complete, two chain loops 25 including corresponding new loop cavities 25C are provided within the base member assembly to allow for chain attachment thereto. It may be understood that the locating spacers 40 provide a locating feature within the loop cavities, in that their presence keeps the fastener passing therethrough from moving transverse to its longitudinal axis, due to interference between the outer edges of the locating spacers and the outer boundaries of their corresponding loop cavities.

The clamping panels 24 are the panels which, as described in more detail elsewhere, are the two panels which are clamped to two corresponding chain loops, such as shown in FIG. 4.

The clamping panels 24 each include a chain loop 25 (each defining a corresponding new loop cavity 25C), and likewise each define a corresponding fastener hole 26. All cavities 25C and holes 26 extend completely through their corresponding clamping panel 24. In this case the chain loop is a portion of the substantially planar metal plate comprising the base frame 22.

The two light box mounting flanges 27 each extend from the outside edge of a corresponding clamping panel 24.

Figure 5:
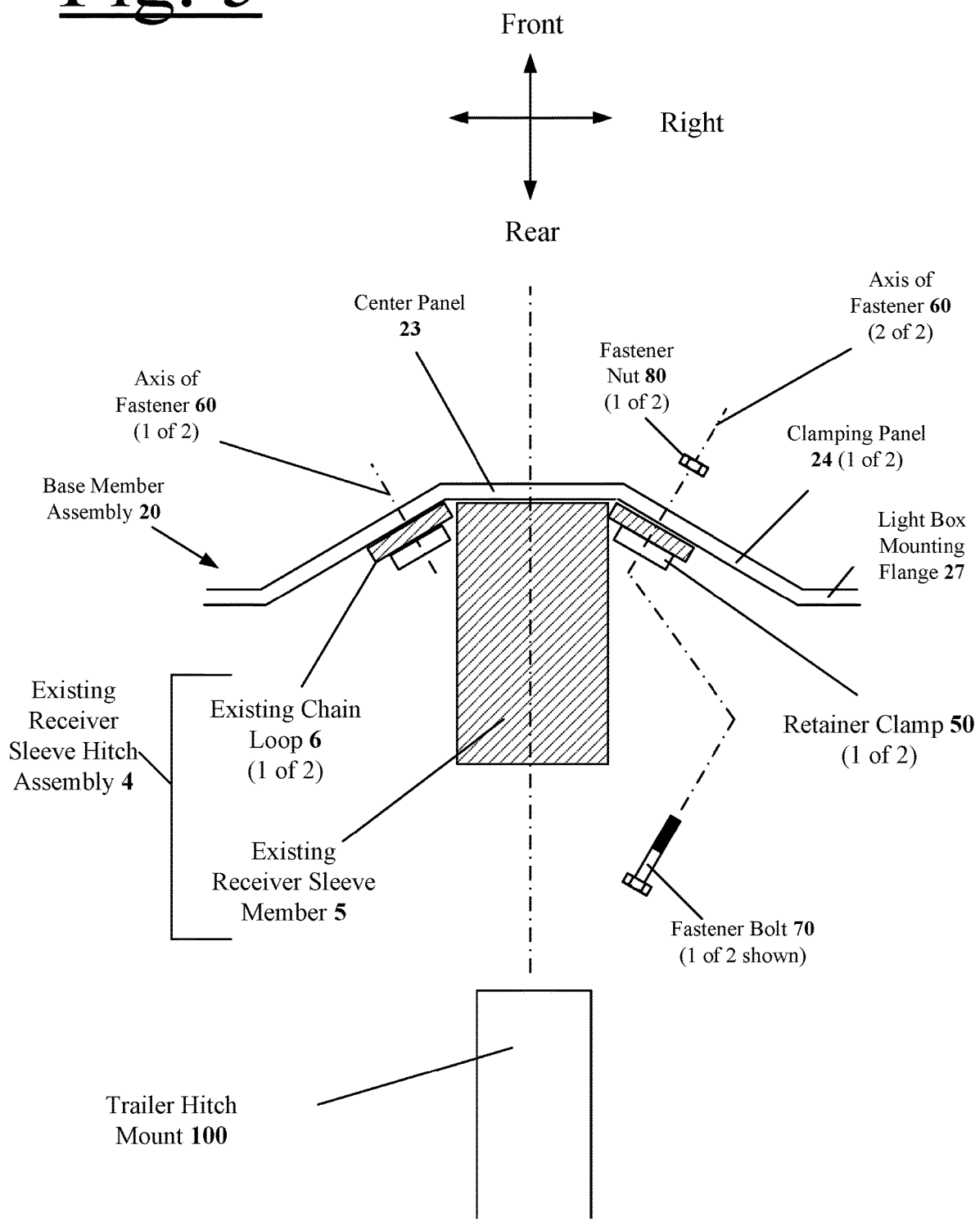
FIG. 5 is a top illustrated view of the connection between the existing chain loops 6 and the clamping panels 24 of the base member assembly 20. As may be seen, a fastener bolt 70 and a fastener nut 80 combine to clamp a corresponding chain loop 6 therebetween. The elements shown in hatched cross section include the existing receiver sleeve member 5 and the two existing chain loops 6, which are welded or otherwise rigidly attached relative to said sleeve member 5. These elements combine to make the existing sleeve hitch assembly 4. Also shown is a trailer hitch mount 100 which is configured to fit within the interior sleeve cavity of the sleeve member 5.

Also referencing FIG. 5, it may be seen that the center panel 23 has primary planar surfaces which are substantially normal to the dotted axis passing through the center of the existing receiver sleeve member 5. Via a bend line, the two clamping panels 24 are at a slight angle in order to conform to a similar angle of the existing chain loops 6 relative to the existing receiver sleeve member 5.

Continuing to reference FIG. 5, it may be seen that, via a bend line, the two light box mounting flanges are at a slight angle relative to their adjacent clamping panels 24, such that their primary planar surfaces are substantially parallel to the primary planar surfaces of the center panel 23.

In the embodiment shown the elements 23, 26, and 27 are made of the same piece of stamped steel plate, but other embodiments are contemplated.

Light Boxes 28

Referring now also to FIG. 7, each of the two light boxes 28 is attached to the outside edge of a corresponding light box mounting flange 27.

Each of the two light elements 29 is included in a corresponding one of the light boxes 28, and is wired to be remotely controlled in a suitable manner.

Assembly and Attachment

As noted earlier, the hitch mounted assembly 10 is attached to the frame of a conventional truck or other vehicle by clamping onto the two "chain loops" which are typically on each side of a conventional sleeve hitch such as shown in FIG. 2A, 2B or 10. This process is now described in reference to at least FIGS. 4, 5, 6, and 8.

Reference is first made to FIG. 4, which is an illustrative view showing the attachment of base member assembly 20 to existing receiver sleeve hitch assembly 4. The dotted line shows the connection of various elements by use of an elongate fastener such as a nut and bolt combination (not shown in FIG. 4, but shown in FIG. 5 as an elongate fastener 60 such as a nut 80 and bolt 70).

Such an elongate fastener passes through one of the fastener holes 26 of the base member assembly 20, then passes through the opening in one of the existing chain loops 6 of the existing receiver sleeve member 5. The fastener then continues through the locating spacer 40, and finally through the retainer clamp 50. When assembled, the locating spacer 40 is positioned within the cavity defined by the existing chain loop 6, and provides a "locating" feature within the loop cavities, in that their presence precludes the fastener passing therethrough from moving transverse to its longitudinal axis, due to interference between the outwardly facing edges of the locating spacers and the inwardly facing boundaries of their corresponding loop cavities.

After one fastener is installed, the second is similarly installed on the other chain loop.

When installation is complete, the retainer clamps 50 and base member assembly combine to sandwich the existing chain loops 27 therebetween, thereby providing a rigid connection between the base member assembly 20 and the existing sleeve hitch assembly 5. When the assembly is complete, two new chain loops 25 including new chain loop cavities 25C are provided within the base member assembly to allow for chain attachment thereto.

FIG. 5 is a top illustrated view of the connection between the existing chain loops 6 and the clamping panels 24 of the base member assembly 20. As may be seen, a fastener bolt 70 and a fastener nut 80 combine to clamp a corresponding chain loop 6 therebetween. The elements shown in hatched cross section include the existing receiver sleeve hitch member 5 and the two existing chain loops 6 are welded to or otherwise rigidly attached relative to said sleeve member 5. These elements combine to make the existing receiver sleeve hitch assembly 4. Also shown is a trailer hitch mount 100 which is configured to fit within the interior sleeve cavity of the sleeve member 5 and to be fixed there by the use of conventional removable pins. This trailer hitch mount can include various other components, including a trailer ball as conventionally used in the towing of a trailer having a corresponding inverted cup to receive the ball.

Figure 6:
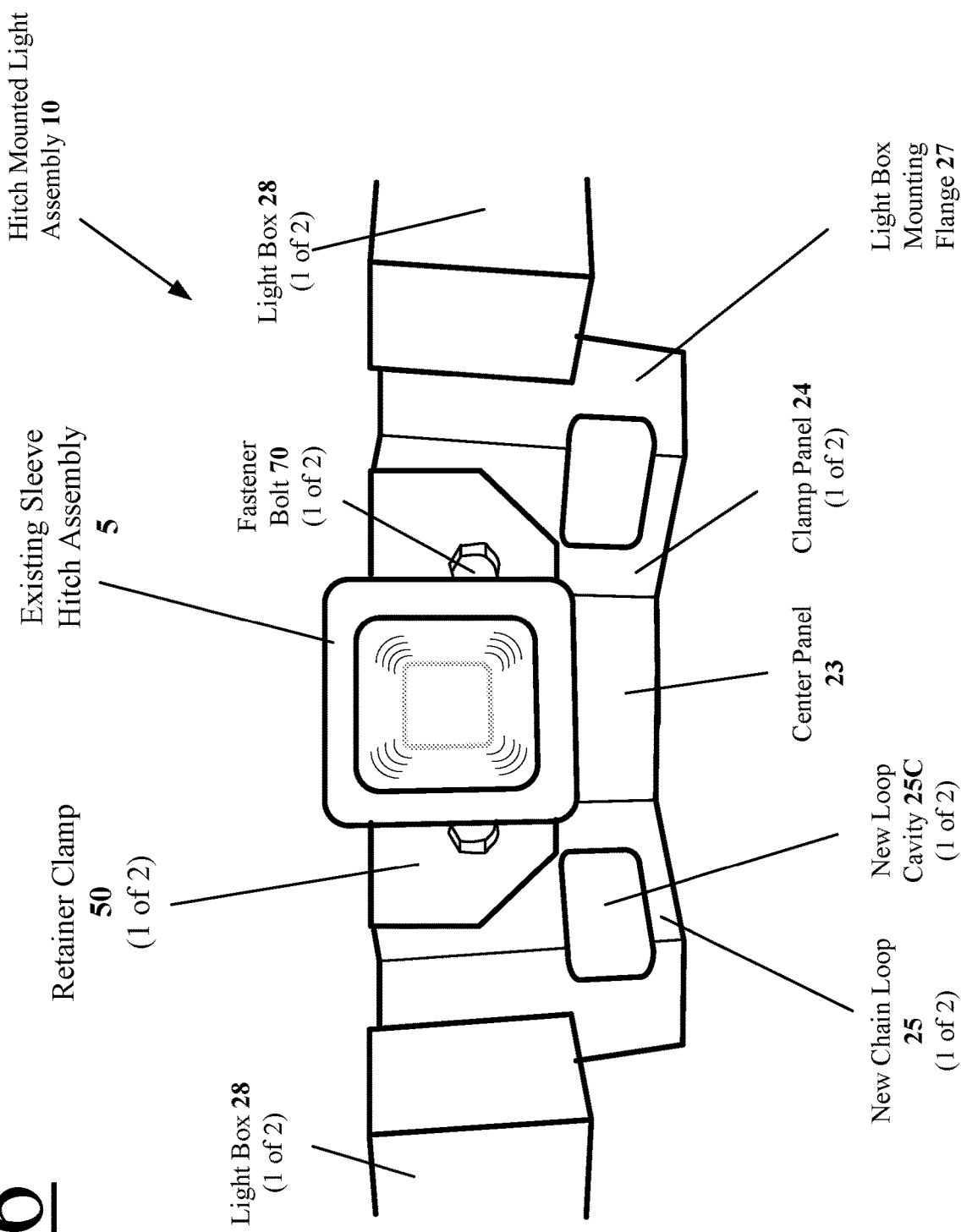
FIG. 6 is a rear view of a portion of that shown in more detail in FIG. 1. This figure shows in more detail the existence of the retainer clamps 50, held by fastener bolts 70, to attach the hitch mounted light assembly 10 to the existing hitch assembly 5.
Figure 8:
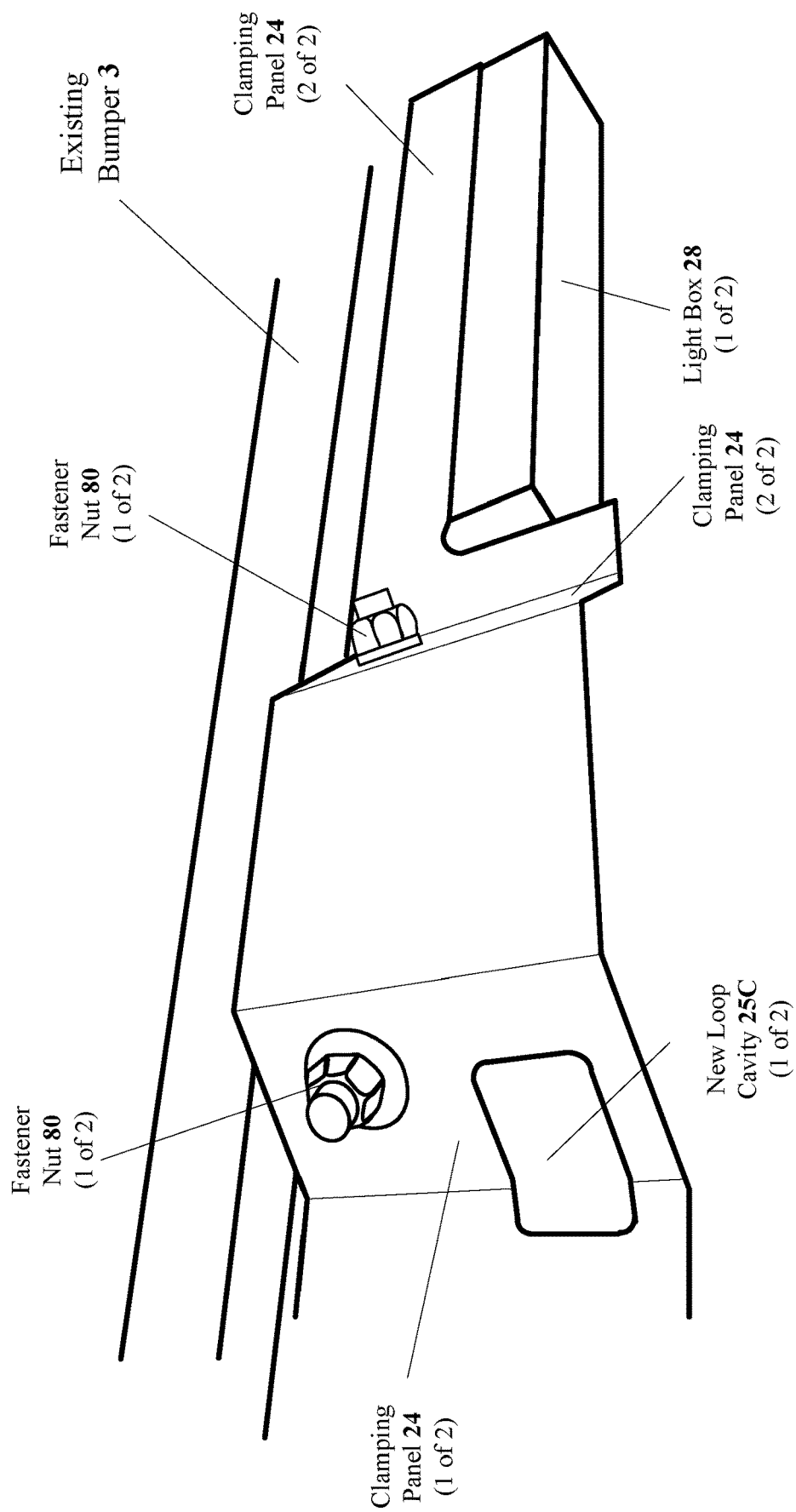
FIG. 8 is a detailed view showing the fastener nuts 80 positioned on the front side of the clamping panels 24.

FIG. 6 is a rear view of a portion of that shown in more detail in FIG. 1. This figure shows in more detail the existence of the retainer clamps 50, held by fastener bolts 70, to attach the hitch mounted light assembly 10 to the existing hitch assembly 5. FIG. 8 also shows the installed configuration.

It may be understood that items other than light boxes may be mounted relative to the base frame 22 of the base member assembly 20, either in combination with or in place of the light boxes and lights.

Alternative Configurations

Figure 9:
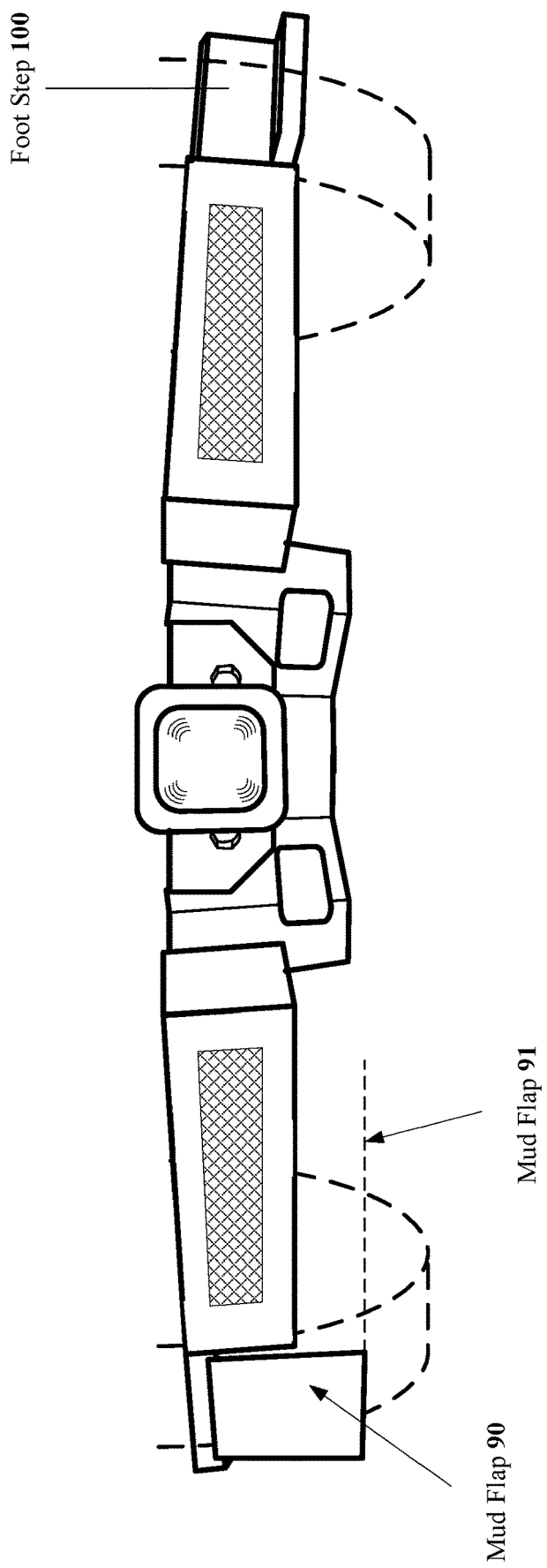
FIG. 9 is a view similar to that as FIG. 1, except that for illustrative purposes, a mud flap 90 is shown on one side, and a footstep 100 is shown on the other side, just as for example. In actual practice, it is possible that only mud flaps or and slash or footsteps would be used for a particular installation. A dotted line shows a mud flap 81 shows an alternate, single, mud flap extending completely along the rear width of the vehicle.

As shown in FIG. 9 a mud flap 90 is shown on one side, and a footstep 100 is shown on the other side, just as for example purposes. In actual practice, it is possible that only mud flaps or and/or footsteps would be used for a particular installation. It may also be understood that a single mud flap 91 extending completely along the rear width of the base frame 22 of the base member assembly 20, as shown by the dotted line.

To show how such other accessories can be used, reference is made to FIG. 10, which is an isolated rear view of a base frame 122, including center panel 123, two clamping panels 124, two new chain loops 125 each defining a chain loop cavity 125C, two fastener holes 126, and two accessory mounting flanges 127. This is similar to that shown in FIG. 3, except the light boxes are not present, and the accessory mounting flange 127 is shown ready to accept various accessories other than lights, including but not limited to footsteps, bicycle racks, mud flaps, storage platforms, etc. This base frame 122 is configured to be attached to existing chain loops in the same manner as is described with respect to base frame 22.

Figure 12:
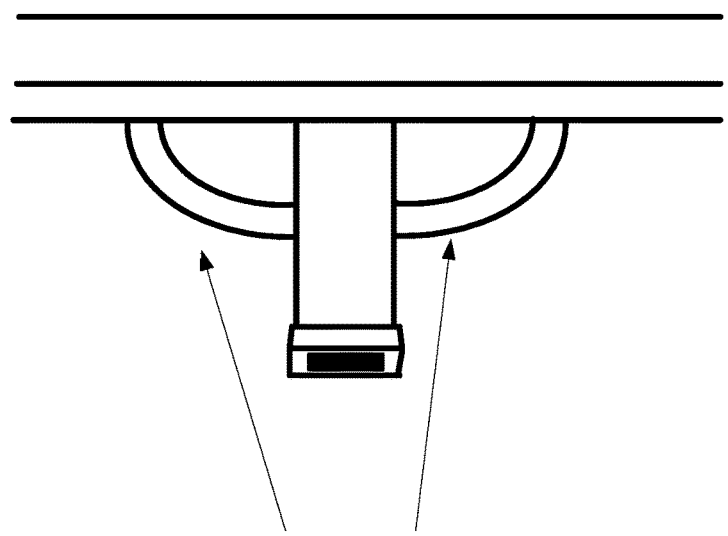
FIG. 12 is an isolated view of a sleeve-mountable hitch assembly with U-shaped chain loops 101 welded thereto, the loops being made of elongate bar stock having a round cross section, bent to the U shapes.

In some cases, "horizontal" chain loops may be encountered. FIG. 11 shows another existing "horizontal" chain loop configuration including two existing chain loops 01, which are formed of steel plate, which the primary planar surfaces of the plate being substantially in the horizontal plane in normal level operation of the vehicle. It may also be understood that round bar stock could also be used in such a configuration to provide similarly oriented holes passing through the chain loops. These chain loops can also be referred to as being "horizonal", as compared to vertical chain loops in FIG. 2A. FIG. 12 is an isolated view of a sleeve-mountable hitch assembly with such U-shaped chain loops 101 welded thereto, the loops being made of elongate bar stock having a round cross section, bent to the U shapes.

Figure 13:
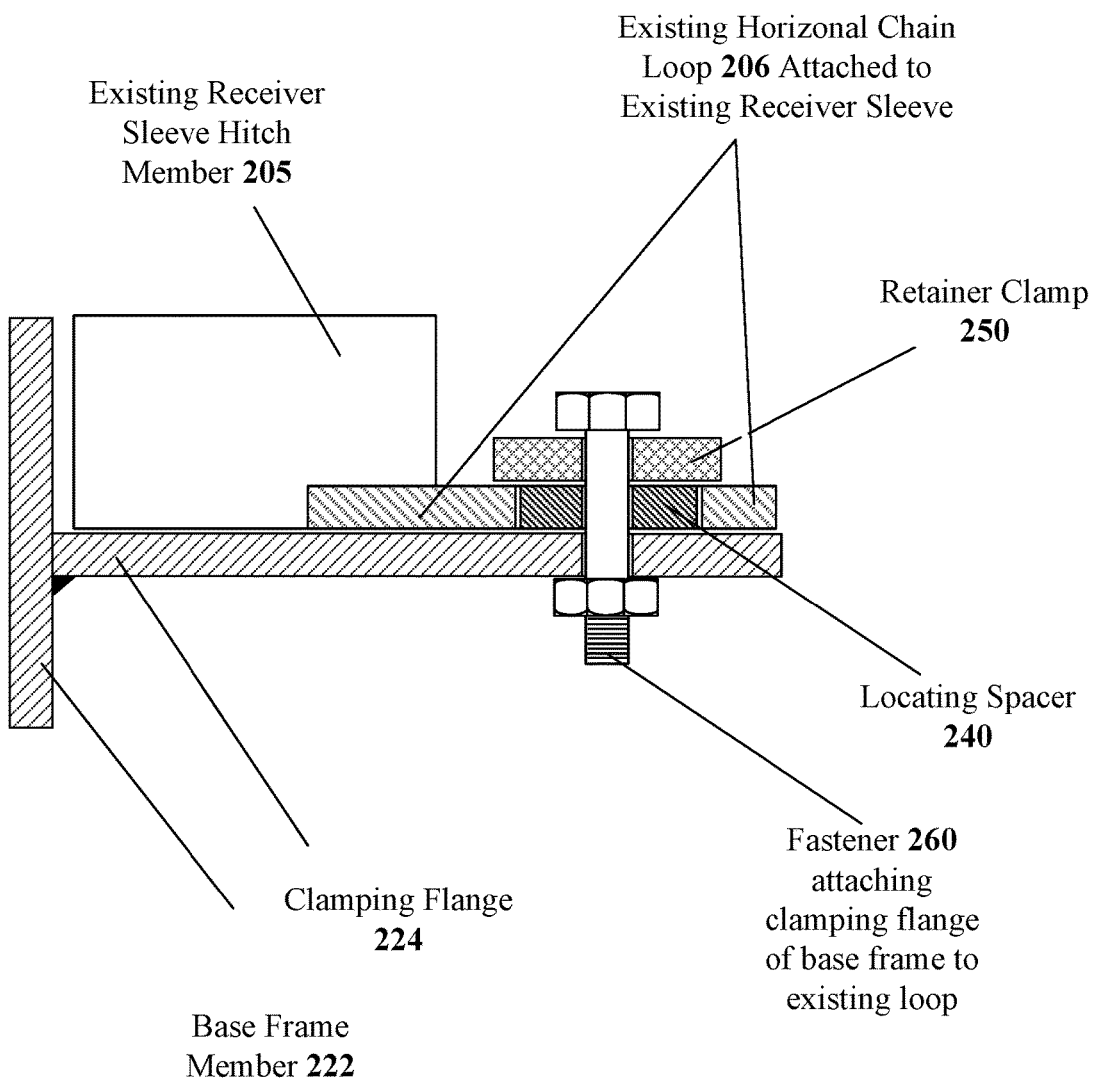
FIG. 13 is an illustrative partial view of an alternate base frame member 222 configured to attach to vehicles with rear chain hooks that are generally "horizontal", such as those shown in FIGS. 10 and 11. Shown is an existing receiver sleeve hitch member 205 which is fixed relative to the associated vehicle (not shown). Rigidly attached to the existing receiver sleeve hitch member 205 are two chain loops to either side of the sleeve hitch opening, such as shown in FIGS. 10 and 11. One of these chain loops is shown in cross section as 206. Fixation of the base frame member 222 to the chain loops 206 is provided by a connection configuration which is similar to that described with respect to FIG. 4. A fastener 260 passes through a retainer clamp 250, then through a locating spacer 240, through the clamping flange 224 of the base frame member 222, and is then captured at the bottom end by a nut. Tightening of the fastener 260 clamps the chain loop 206 between the clamping flange 224 and the retainer clamp 250, thus rigidly attaching the base frame member 222 to the chain loop 206, and thus to the frame of the vehicle. As the chain loops are on either side of the existing sleeve hitch member 205, it is still available for use after the base frame member 222 is attached thereto.

FIG. 13 is an illustrative partial view of an alternate base frame member 222 configured to attach to vehicles with rear chain hooks that are generally "horizontal", such as those shown in FIGS. 11 and 12. Shown is an existing receiver sleeve hitch member 205 which is fixed relative to the associated vehicle (not shown). Rigidly attached to the existing receiver sleeve hitch member 205 are two chain loops to either side of the sleeve hitch opening, such as shown in FIGS. 10 and 11. One of these chain loops is shown in cross section as 206. Fixation of the base frame member 222 to the chain loops 206 is provided by a connection configuration which is similar to that described with respect to FIG. 4. A fastener 260 passes through a retainer clamp 250, then through a locating spacer 240, through the clamping flange 224 of the base frame member 222, and is then captured at the bottom end by a nut. Tightening of the fastener 260 clamps the chain loop 206 between the clamping flange 224 and the retainer clamp 250, thus rigidly attaching the base frame member 222 to the chain loop 206, and thus to the frame of the vehicle. As the chain loops are on either side of the existing sleeve hitch member 205, it is still available for use after the base frame member 222 is attached thereto.

Advantages

Advantages of this system are obvious. A simple attachment configuration is provided with a minimum of tools and installation effort. Once attached, the existing sleeve hitch opening can still be used, and substitute chain loops are provided which may be even better than the factory or preexisting version.

CONCLUSION

Various modifications and variations can be made in the present invention without departing from the spirit or scope of the invention.

From the foregoing, it will be seen that this invention is one well adapted to obtain all the ends and objects herein set forth, together with other advantages which are obvious, and which are inherent to the structure.

It will be understood that certain features and sub combinations are of utility and may be employed without reference to other features and sub combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A device for attachment to a vehicle, said vehicle having a first chain loop and a receiver hitch sleeve member defining a receiver sleeve hitch member opening, said first chain loop configured for attachment relative to a trailer safety chain, said first chain loop being rigid and rigidly attached relative to the frame of said vehicle, said receiver hitch sleeve opening configured for accepting a trailer hitch mount, said device comprising:
    A) a clamping panel configured to be selectively attached relative to said first chain loop;
    B) a light box mounting flange rigidly attached relative to said clamping panel;
    C) a retainer clamp separate from elements A-B;
    D) a light member separate from elements A-C and detachably attached relative to said light box mounting flange; and
    E) an elongate fastener separate from elements A-D and configured to connect to said clamping panel and also configured to connect to said retainer clamp, such that said clamping panel and said retainer clamp combine to fixedly capture said first chain loop therebetween, thus providing a selective fixed installed connection between said first chain loop and said clamping panel, such that when said clamping panel is in place due to said selective installed connection, said light box mounting flange and said light member are likewise installed.

2. The device as claimed in claim 1, wherein said elongate fastener includes a headed bolt and nut combination.

3. The device as claimed in claim 2, wherein said elongate fastener has an elongate portion which passes through corresponding holes in said retainer clamp, said first chain loop, and said clamping panel.

4. The device as claimed in claim 3, wherein said first chain loop defines a first chain loop cavity, and further comprising a locating spacer defining a hole therein for accepting a length of said elongate fastener, said locating spacer when installed providing a spacing feature within said first chain loop cavity.

5. The device as claimed in claim 1, wherein said elongate fastener has an elongate portion which passes through corresponding holes in said retainer clamp, said first chain loop, and said clamping panel.

6. The device as claimed in claim 5, wherein said first chain loop defines a first chain loop cavity, and further comprising a locating spacer defining a hole therein for accepting a length of said elongate fastener, said locating spacer when installed providing a spacing feature within said first chain loop cavity.

7. The device as claimed in claim 2, wherein said first chain loop defines a first chain loop cavity, and further comprising a locating spacer defining a hole therein for accepting a length of said elongate fastener, said locating spacer when installed providing a spacing feature within said first chain loop cavity.

8. A device for attachment to a vehicle, said vehicle having a first chain loop and a receiver hitch sleeve member defining a receiver sleeve hitch member opening, said first chain loop configured for attachment relative to a trailer safety chain, said first chain loop being rigid and rigidly attached relative to the frame of said vehicle, said receiver hitch sleeve opening configured for accepting a trailer hitch mount, said device comprising:
    A) a clamping panel configured to be selectively attached relative to said first chain loop;
    B) a light box mounting flange rigidly attached relative to said clamping panel;
    C) a second chain loop member rigidly attached relative to said clamping panel;
    D) a retainer clamp separate from elements A-C;
    E) a light member separate from elements A-D and detachably attached relative to said light box mounting flange; and
    F) an elongate fastener separate from elements A-E and configured to connect to said clamping panel and also configured to connect to said retainer clamp, such that said clamping panel and said retainer clamp combine to fixedly capture said first chain loop therebetween, thus providing a selective fixed installed connection between said first chain loop and said clamping panel, such that when said clamping panel is in place due to said selective installed connection, said light box mounting flange, said light member, and said second chain loop member are likewise installed, and
    said second chain loop is available for use in place of said first chain loop.

9. The device as claimed in claim 8, wherein said elongate fastener includes a headed bolt and nut combination.

10. The device as claimed in claim 9, wherein said elongate fastener has an elongate portion which passes through corresponding holes in said retainer clamp, said first chain loop, and said clamping panel.

11. The device as claimed in claim 10, wherein said first chain loop defines a first chain loop cavity, and further comprising a locating spacer defining a hole therein for accepting a length of said elongate fastener, said locating spacer when installed providing a spacing feature within said first chain loop cavity.

12. The device as claimed in claim 8, wherein said elongate fastener has an elongate portion which passes through corresponding holes in said retainer clamp, said first chain loop, and said clamping panel.

13. The device as claimed in claim 12, wherein said first chain loop defines a first chain loop cavity, and further comprising a locating spacer defining a hole therein for accepting a length of said elongate fastener, said locating spacer when installed providing a spacing feature within said first chain loop cavity.

14. The device as claimed in claim 8, wherein said first chain loop defines a first chain loop cavity, and further comprising a locating spacer defining a hole therein for accepting a length of said elongate fastener, said locating spacer when installed providing a spacing feature within said first chain loop cavity.

\* \* \* \* \*